May 15, 1962 R. A. WOLFE 3,034,794

RECORD REPEATER

Filed March 29, 1960

INVENTOR

Robert A. Wolfe

BY

Wooster, Davis & Cifelli

ATTORNEYS.

United States Patent Office 3,034,794

Patented May 15, 1962

3,034,794

RECORD REPEATER

Robert A. Wolfe, Fairfield, Conn., assignor to Spear Products, Incorporated, Bridgeport, Conn., a corporation of Connecticut Filed Mar. 29, 1960, Ser. No. 18,439

7 Claims. (Cl. 274—15)

This invention relates to a record repeater for phonographs, particularly of the type which comprises a disk of light, thin sheet material which may be placed on the record and will automatically lift the reproducing needle from the record when it reaches the inner edge of the playing surface, shift it to the outer edge of this playing surface, and then lower it onto the record for repeat playing of this record.

It is also an object to provide such a repeater which may be used with the electronic type of reproducing apparatus and pick-up needle, the means for lifting the needle from the record and shifting it to the outer edge of the playing surface for the repeat operation being entirely separate from and independent of the playing needle, so that the repeater has no effect on the reproducing action of the playing needle and there is no distortion of the reproduction and no tendency to retard or force the playing needle laterally to cause it to jump from one groove to another.

It is also an object to provide such a repeater in which, as the playing needle is shifted from the inner to the outer edge of the playing surface of the record, this playing needle is entirely free and out of contact with any part of the repeater, and therefore there is no sound as the playing needle is shifted from the inner edge of the playing surface at the end of the playing of the record to the outer edge of this surface to start the repeat of the playing action.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

Figures 1, 2, 3, 4, 5, 6:
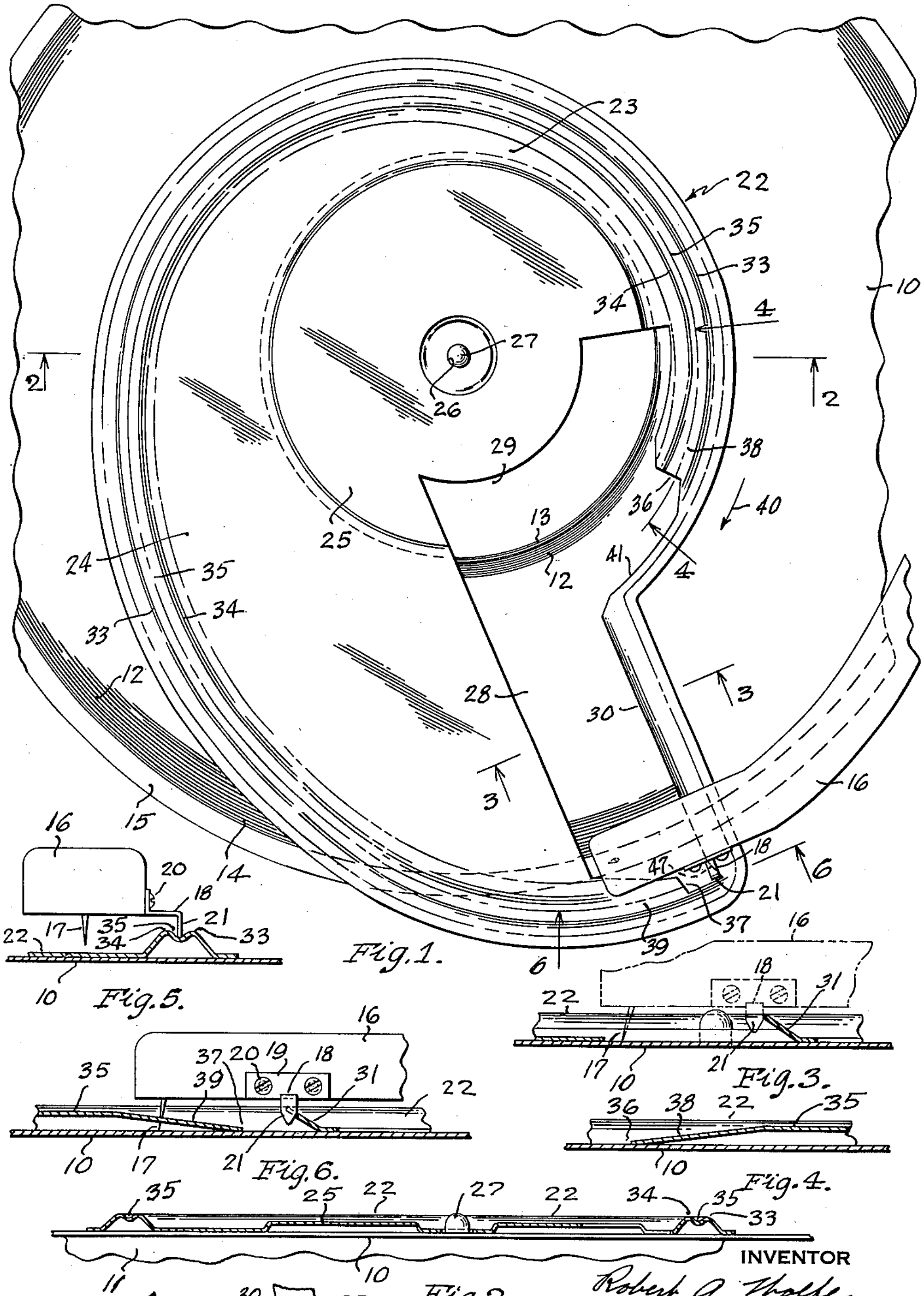
FIG. 1 is a top plan view showing this repeater in position on a phonograph record with parts of the record and the tone arm broken away, the tone arm being shown at the beginning of the replaying of the record.
FIG. 2 is a transverse section of the repeater taken substantially on line 2—2 of FIG. 1, an edge view of the record being shown in full lines.
FIG. 3 is a detail section of the record and the player substantially on line 3—3 of FIG. 1, a side view of the free end portion of the tone arm and needles being shown in broken lines.
FIG. 4 is a detail section of a portion of a record and the repeater showing the entrance for the guide means to the return groove.
FIG. 5 is a view looking toward the free end of the tone arm and a section of a portion of the record and the repeater showing how the guide needle has lifted the reproducing needle from the record for its return to the outer edge of the playing surface to start the replaying action.
FIG. 6 is a detail section of a portion of the record and the repeater taken substantially on line 6—6 of FIG. 1 with a side elevational view of the free end portion of the tone arm showing this arm and the playing needle in preparation for the start of the repeat operation.
Figure 7:
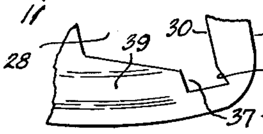
FIG. 7 is a detail plan view of the outer end portion of the radial guide slot or opening in the repeater.

On the drawing, a record of the disk type is shown at 10 resting on the top of the usual type of turntable of a phonograph, a portion of the outer flange of which is indicated at 11. The grooved playing surface of the record is indicated by the lines 12, the inner edge of this playing surface being indicated at 13 and its outer edge at 14, with the usual nongrooved flat narrow band 15 between the outer edge of the playing surface and the edge of the disk. The free end portion of the tone arm is indicated at 16 carrying the reproducing needle 17 in any suitable type of electronic reproducing cartridge carried in this free end of the tone arm and not shown, but, of course, connected electrically with the reproducing mechanism. Mounted on one side of this free end portion of the tone arm is a guide needle 18. This may be of any desired shape and stiffness, but in the form shown is a substantially flat member extending outwardly or laterally from the lower edge of a strip 19 secured to the side of the tone arm 16 by any suitable means, such, for example, as the screws 20, and provided with a downwardly extending free end which may be tapered if desired as indicated at 21.

The repeater element, indicated as a whole by the numeral 22, is made of some thin sheet material, preferably pressed from a thin sheet of suitable plastic material so that it will be of light weight and may rest on top of the record and be held against turning with the record during the playing operation without marring or injuring the surface of the record. It comprises a somewhat circular central portion 23 and an eccentric portion 24 forming a continuation thereof, and may have a somewhat raised central boss 25 provided with a central opening 26 to receive the spindle 27 of the turntable, and center and position this repeater in proper location on the record. This disk of sheet material is provided with a radially extending slot or opening 28 extending from the inner end 29 spaced laterally from the center of the disk and extending beyond the inner edge 13 of the playing surface 12 of the record to an outer end extending beyond the outer edge 14 of the playing surface, as shown in FIG. 1. At the rear edge of this slot or opening is a generally radially extending guide means 30 for the guide needle 18, as will later be described. This guide means may be formed in different ways, but a simple and effective means, as shown, is to incline a free edge portion 31 of the sheet metal disk 22 upwardly and inwardly toward the radial slot, as shown at 31 in FIGS. 3 and 6, the free edge 30 of this inclined portion forming the guide means for the downwardly extending portion 21 of the needle 18, as shown in these figures. The radially extending slot or opening 28 is of a width so that when the guide needle 21 is resting against and running along the guide means 30, the reproducing needle 17 is also in this opening and resting on the grooved reproducing surface 12 of the record, as indicated in FIGS. 1, 3 and 6.

The top surface of the disk 32 is provided with parallel, laterally spaced, upwardly extending eccentric beads or ribs 33 and 34 providing between them an eccentric guideway or channel 35 for the guide needle 21, and this channel or guideway is also eccentric and curved so that it extends from a point 36 at the inner end of the opening 28 to an exit point 37 at the outer end of this radial opening. Also, the bottom surface for a short distance from the entrance end 36 is inclined upwardly, as shown at 38 (FIG. 4) to the channel or groove 35, and the exit end portion 39 of this channel or groove leading down to the exit 37 is inclined downwardly, as shown in FIG. 6. The portion of the channel or grooves 35 between the upwardly inclined portion 38 and the downwardly inclined portion 39 is of a height as shown in FIG. 5, and the needle 21 is of such a length, so that when this guide needle 21 is running in this groove or channel the free end of the tone arm 16 is lifted sufficiently to raise the reproducing needle 17 from and to a position above the playing surface 12 of the record.

The operation is as follows:

To start playing of the record, this sheet material member 22 is placed on the record and properly centered and positioned by the turntable spindle 27, and the tone arm is lowered to lower the reproducing needle 17 onto the outer edge of this playing surface or the narrow flat band 15, as shown in FIGS. 1 and 3, with the guide needle 21 engaging the radial guiding means or edge 30. During the playing operation of the record, the reproducing needle 17 runs along the grooved playing surface 12 in the usual manner while the guide needle 21 moves radially inwardly along the guide 30, and by holding action against this guide holds the repeater 22 against rotation with the record. The guide needle 21 and guide 30 are of lengths and so positioned with respect to the reproducing needle 17 that when the needle 17 reaches the inner edge 13 of the playing surface the guide needle 21 reaches the inner end of the guide 30, and as it runs off this inner end the repeater disk 22 is no longer held against rotation with the record but starts to rotate in the direction of the arrow 40 with the guide needle running along the edge 41 of the opening in the repeater, and it is guided onto the entrance 36 where it rides up the upwardly inclined entrance portion 38 to the raised channel or groove 35. As it does so, it raises the reproducing needle 17 from the playing surface of the record, the length of the needle 21 and the height of the channel or groove 35 being such as to maintain this playing needle 17 above and spaced from the record until it is shifted to the outer edge 14 of the playing surface and again lowered onto the record. It is lowered onto the outer edge 14 of the playing surface of the record or the flat band 15 as the guide needle 21 runs down the downwardly inclined portion 39 at the outer end of the channel or groove 35, and as this needle runs off the exit 37 it engages the inclined edge 42 at the outer end of the radial slot 28 and runs up onto the guide 30 as the playing needle 17 runs onto the playing surface 12 for the repeat operation. The edge 47 which first engages the guide needle 21 as it leaves the exit end 37 of the groove 35 has a slight retarding action on the inward radial movement of this needle and tone arm which prevents it from bouncing out onto the guide 30, which might cause the needle 17 to jump some of the outer grooves of the playing surface.

It will be seen from the above that the playing of the record may be repeated as long and as many times as desired by merely leaving this device on the surface of the record while operating the turntable with the record on it. As the reproducing needle 17 reaches the inner edge 13 of the playing surface the guide needle runs up the inclined surface 38 forming the entrance to the eccentric channel 35, thus lifting the playing needle slowly and without bounce from the playing surface, and it is retained above and free from this surface until the guide needle 21 runs down the downwardly inclined surface 39 of the eccentric guide channel 35. This surface 39 is gradually inclined so that the playing needle 17 is gradually lowered onto the playing surface or the band 15 without dropping, so there is no danger of injury to this needle or the cartridge in which it is mounted. It will also be clear that the action of the guide needle 21 is entirely separate from and independent of the reproducing or playing needle 17, and therefore there is no sound while this needle 17 is being shifted from the inner edge 13 of the playing surface to its outer edge 14, and this permits the use of this device with an electronic reproducing unit, as it does not affect the action of the playing needle in any way. Also, for this reason there is no distortion of the reproduction and there is no pushing of the reproducing needle out of the sound track or grooves, as might be the case if the guide for retaining the repeater against rotation with the record were in contact with the reproducing needle. Although the feeding of the tone arm inwardly during the playing operation is controlled by the playing needle 17, the guide means 30 for the guide needle 21 may be inclined somewhat and so positioned or related to the pivotal mounting for the tone arm that it has a sufficient tendency to shift the tone arm inwardly to remove this feeding action of the tone arm from the reproducing needle 17. Also, as the guide needle is separate from and acts independently of the reproducing needle, the guide needle may be made as rigid as desired to effectively secure positive and reliable operation of the shifting of the playing needle from the inner to the outer edges of the playing surface.

Having thus set forth the nature of my invention, I claim:

1. The combination of a phonograph turntable on a spindle and a tone arm carrying a reproducing needle to rest on a record on said turntable, a guide needle carried by the tone arm separate from and independent of the reproducing needle, a record repeater comprising a thin sheet of material adapted to rest on a record on said turntable and provided with an opening to receive said spindle, said sheet provided with a radial slot through which the reproducing needle may engage the record, said sheet provided on its top surface with a curved guideway extending from an entrance at the inner end of the slot to an exit at the outer end of the slot, said guideway adapted to receive the guide needle and lift the tone arm to lift the reproducing needle from the record at the inner end of the slot and shift it to the outer end of the slot by turning movement of the repeater with the record and then lower the reproducing needle onto the record, and said repeater provided with a radial guide means adapted to engage the guide needle to prevent rotation of the repeater with the record while the reproducing needle engages the playing surface of the record and guide the guide needle from the outer exit end of the guideway to the entrance to this guideway.

2. The combination of a phonograph turntable on a spindle and a tone arm carrying a reproducing needle to rest on a record on said turntable, a guide needle carried by the tone arm separate from and independent of the reproducing needle, a record repeater comprising a thin sheet of material adapted to rest on a record on said turntable and provided with an opening to receive said spindle, said sheet provided with radial guide means adapted to engage the guide needle to prevent rotation of the repeater with the record while the reproducing needle is in engagement with the playing surface of the record, said sheet provided on its top surface with a curved guideway extending from an entrance at the inner end of said guide means to an exit at the outer end of the guide means, said guideway adapted to receive the guide needle from the inner end of the guide means when the reproducing needle reaches the inner edge of the playing surface and lift the tone arm to lift the reproducing needle from the record, and said guideway then adapted by turning movements of the repeater with the record to shift the tone arm outwardly until the reproducing needle is at the outer edge of the playing surface and then lower it onto said surface.

3. The combination of a phonograph turntable on a spindle and a tone arm carrying a reproducing needle and a guide needle separate from and independent of the reproducing needle, a record repeater comprising a body member resting on the record, said body member provided with radial guide means to engage the guide needle to prevent rotation of said body member with the record while the reproducing needle is in engagement with the playing surface of the record, said body member provided on its top surface with a curved guideway extending from an entrance at the inner end of said guide means to an exit at the outer end thereof, said guideway adapted to receive the guide needle from the inner end of the guide means when the reproducing needle reaches the inner edge of the playing surface and lift the tone arm to lift the reproducing needle from the record, and said guideway adapted by turning movements of the body member with the record after lifting the reproducing needle from the record to shift the guide needle and the tone arm outwardly until the reproducing needle is at the outer edge of the playing surface and then lower it onto said surface.

4. A record repeater comprising a body member adapted to rest on a phonograph record on a turntable, said body member provided with radial guide means adapted to engage a guide needle on a tone arm carrying a reproducing needle to prevent turning of the body member with the record while the reproducing needle is in engagement with the playing surface of the record, said guide needle being mounted on the tone arm separate from and independent of the reproducing needle, said body member provided on its top surface with a curved guideway extending from an entrance at the inner end of said guide means to an exit at the outer end thereof, said guideway positioned to receive the guide needle from the inner end of the guide means when the reproducing needle reaches the inner edge of the playing surface and adapted to then lift the tone arm to lift the reproducing needle from the record, and said guideway shaped to act by turning movement of the body member with the record after lifting of the reproducing needle from the record to shift the guide needle and the tone arm outwardly until the reproducing needle is at the outer edge of the playing surface and then lower it onto said surface.

5. A record repeater comprising a thin sheet of material adapted to rest on a phonograph record on a turntable and provided with an opening to receive the turntable spindle, said sheet provided with a radial slot through which a reproducing needle carried by a tone arm may engage the record, said sheet provided on its top surface with a curved guideway extending from an entrance at the inner end of the slot to an exit at its outer end adapted to receive a guide needle on the tone arm separate from and independent of the reproducing needle and lift this guide needle and the tone arm to lift the reproducing needle from the record at the inner end of the slot and shift it to the outer end of the slot by turning movement of the repeater with the record and then lower the reproducing needle onto the record, and a radial guide means adapted to engage the guide needle to prevent rotation of the sheet with the record while the reproducing needle is in engagement with the record and guide the guide needle from the outer exit end of the guideway to the entrance to said guideway.

6. The repeater according to claim 5 in which the bottom surface of the entrance to the guideway is inclined upwardly to lift the tone arm and the reproducing needle from the record as the guide needle enters the guideway, and the bottom surface of the exit end of the guideway is inclined downwardly to lower the tone arm and the reproducing needle onto the surface of the record as the guide needle leaves the guideway.

7. A record repeater comprising a body member adapted to rest on a record on a phonograph turntable, said body provided with guide means adapted to engage a guide needle on a tone arm carrying a reproducing needle with the guide needle separate from and independent of the reproducing needle to prevent turning of the body with the record while the reproducing needle is in engagement with the playing surface of the record, said body member also provided on its top surface with a guideway positioned and shaped to receive the guide needle from the guide means when the reproducing needle reaches the inner edge of the playing surface, lift the reproducing needle from this surface and act by turning movement of the body member with the record to then shift the reproducing needle to the outer edge of the playing surface and lower it onto this surface.

References Cited in the file of this patent

UNITED STATES PATENTS 1,349,240 Voith ---------------- Aug. 10, 1920